US006341759B1

(12) United States Patent
Noller et al.

(10) Patent No.: US 6,341,759 B1
(45) Date of Patent: Jan. 29, 2002

(54) ELECTROMAGNETIC ACTUATING VALVE AND METHOD FOR PRODUCING A MAGNETIC CASING FOR A VALVE

(75) Inventors: Klaus Noller, Oppenweiler; Werner Hanft, Hallstadt; Hubert Stier, Asperg, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/623,121

(22) PCT Filed: Oct. 22, 1999

(86) PCT No.: PCT/DE99/03391

§ 371 Date: Nov. 15, 2000

§ 102(e) Date: Nov. 15, 2000

(87) PCT Pub. No.: WO00/39448

PCT Pub. Date: Jul. 6, 2000

(30) Foreign Application Priority Data

Dec. 29, 1998 (DE) ........................................ 198 60 631

(51) Int. Cl.[7] ............................ F16K 31/02; H01F 7/00
(52) U.S. Cl. .................................. 251/129.15; 335/278
(58) Field of Search ....................... 251/129.01, 129.15, 251/366; 335/278, 281

(56) References Cited

U.S. PATENT DOCUMENTS 3,593,241 A * 7/1971 Ludwig ...................... 335/262
3,757,262 A * 9/1973 Saarem et al. .............. 335/260
4,800,912 A 1/1989 Hafner et al.
5,190,223 A 3/1993 Mesenich
5,544,816 A 8/1996 Nally et al.
6,219,903 B1 * 4/2001 Osterhart et al. .......... 29/602.1

FOREIGN PATENT DOCUMENTS

DE 38 25 135 A 1/1990
DE 39 04 448 A1 8/1990
DE 40 03 229 A1 8/1991

* cited by examiner

*Primary Examiner*—Kevin Shaver
*Assistant Examiner*—David A. Bonderer
(74) *Attorney, Agent, or Firm*—Kenyon & Kenyon

(57) ABSTRACT

An electromagnetically operable valve having an electromagnetic circuit which includes at least one solenoid coil (1), a core used as internal pole, and an armature, as well as a magnet housing (60) at least partially surrounding the solenoid coil (1). The magnet housing (60) is produced from a sheet-metal blank with the aid of rolling or bending. The magnet housing (60) has a middle housing area (630) that is adjoined in the axial direction on both sides by attachment areas (640, 650) which have a smaller outside diameter than the housing area (630).

The valve is particularly suitable as a fuel injector for fuel-injection systems of mixture-compressing internal combustion engines with externally supplied ignition.

8 Claims, 3 Drawing Sheets

ELECTROMAGNETIC ACTUATING VALVE AND METHOD FOR PRODUCING A MAGNETIC CASING FOR A VALVE

FIELD OF THE INVENTION

The invention relates to an electromagnetically operable valve and a method for producing a magnet housing for a valve.

BACKGROUND INFORMATION

Conventional electromagnetically valves have an actuator that includes at least one solenoid coil, a magnet armature for opening and closing the valve and an outer conductive element, such as a magnet case, i.e., a magnet housing or conductive bracket, conducting the magnetic flux.

Usually such magnet housings are produced by surface machining; Lathing milling, boring and fine-finishing steps are conventional methods for producing a magnet housing.

Furthermore, German unexamened Patent Application No. 40 03 229 or U.S. Pat No. 5,544,816 to describe producing magnet housings for electromagnetically operable valves by deep drawing. In that case, the magnet housings have a wide opening at one axial end to permit axial insertion of a solenoid coil. Additional covering elements are necessary in the region of the wide opening to close the magnetic circuit. To pass coil pins through, extra feed-through openings or cutouts must be provided in the magnet housing which are formed by boring or milling.

Another design possibility of an outer magnet housing is for two bracket-type conductive elements to partially surround the solenoid coil, described in German unexamened Patent Application No. 38 25 135. For example, these conductive elements are punched components brought into the desired form by shaping.

Such conductive elements can also be executed as sintered brackets.

Independent of the magnet housings mentioned, German unexamened Patent Application No. 39 04 448 to describe producing a magnet armature from a sheet-metal strip of slight thickness, the magnet armature, together with a sleeve-type connecting part and a spherical valve-closure member, is part of an axially moveable valve needle. A section is first punched out in the desired form from a sheet metal and is subsequently rolled or bent in such a way that a magnet armature is formed having a circular periphery.

SUMMARY

The valve of the present invention has the advantage that it can be produced and mounted in a very simple manner. The magnet housing, at least partially surrounding the solenoid coil, is advantageously formed such that the solenoid coil can be inserted into it in the radial direction. The magnet housing is formed so that no additional components are necessary for closing the magnetic circuit around the solenoid coil. The magnet housing can be ideally mounted in the valve due to its shaping.

A further advantage is that reduced tolerance demands are made on the outside diameter of the core and valve-seat support, as well as the inside diameter of the magnet housing, without adversely influencing the magnetic junction between these components.

Additional advantageous further developments and improvements of the valve are possible.

The attachment areas are advantageously segmented, the segments being formed by a plurality of recesses in these attachment areas. The segments act like a collet and can be easily opened during mounting by a slight force action. Thus, the formation of a cutting and the development of scratches are avoided. Since the collet-like attachment areas are under prestress, the position of the magnet housing in the valve, e.g., on the core, is already well fixed in position after mounting.

The method of the present invention for producing a magnet housing for a valve has the advantage that a magnet housing can be produced in a simple manner. The magnet housing can largely surround a solenoid coil in the axial direction and in the circumferential direction without additional measures being necessary for closing the magnetic circuit. The magnet housing can already be formed using the method of the present invention in such a way that no further outer magnetic-circuit components are necessary, and no pass-through openings or cutouts have to be introduced using additional cutting-work methods such as milling or boring.

DETAILED DESCRIPTION

Figure 1:
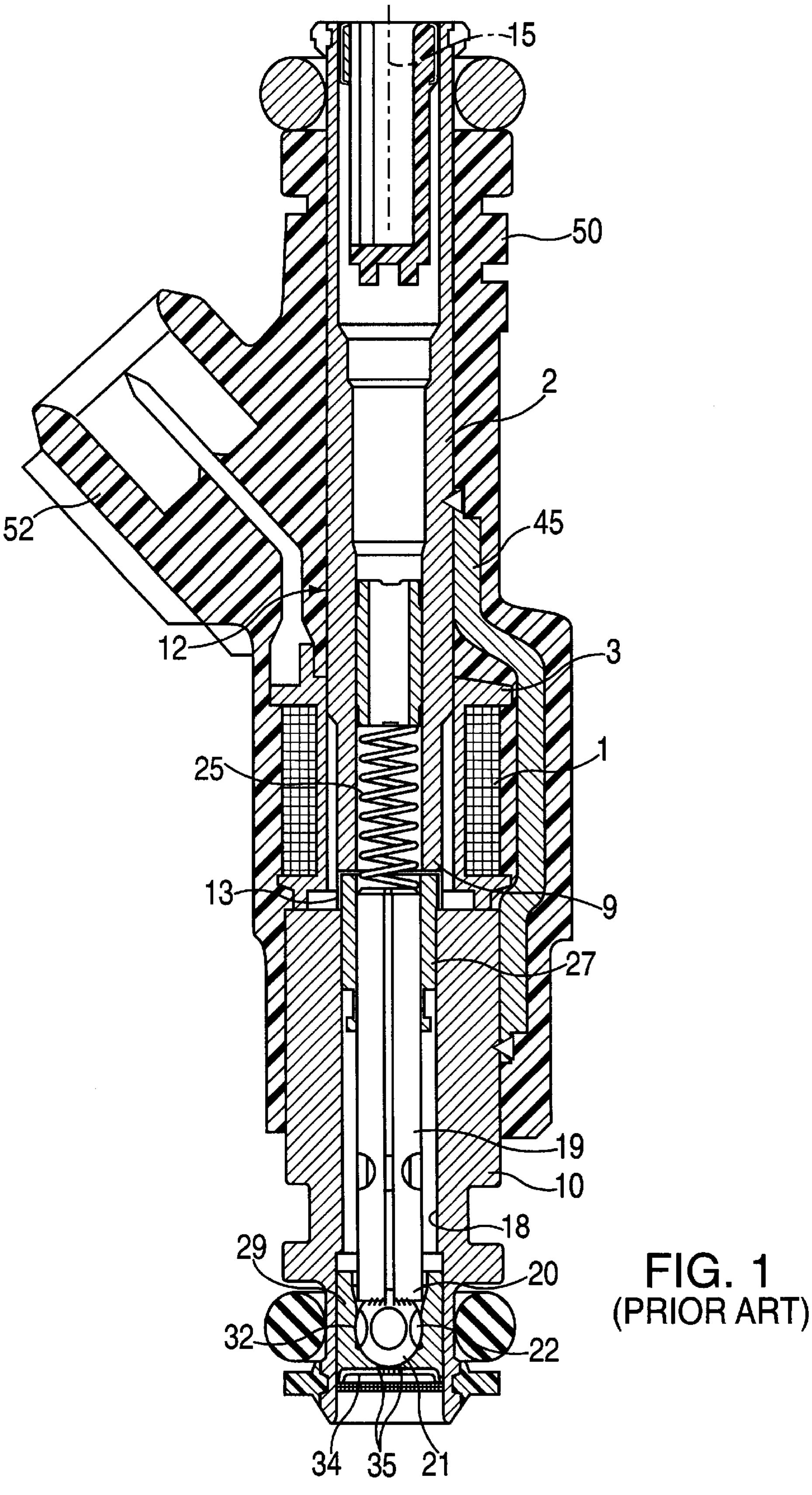
FIG. 1 (PRIOR ART)
FIG. 1 is a cross-sectional view of a prior art electromagnetically operable valve having two bracket-type conductive elements as outer magnetic-flux components.

FIG. 1 shows a conventional electromagnetically operable valve which represents a possibility for the use of a magnet housing of the present invention. The electromagnetically operable valve, shown illustratively in FIG. 1, in the form of an injector for fuel injection systems of mixture-compressing internal combustion engines having externally supplied ignition has a tubular core 2, as a so-called internal pole, which is used as a fuel-inlet connection and is surrounded by a solenoid coil 1. A coil shell 3 accommodates a winding of solenoid coil 1.

Core 2 extends a downstream core end 9, and beyond it further in the downstream direction, so that a tubular connector which is arranged downstream of coil shell 3, and which in the further course is designated as valve-seat support 10, is formed in one piece with core 2, the entire component being designated as valve tube 12. As the junction from core 2 to valve-seat support 10, valve tube 12 has a magnetic restrictor 13 which is likewise tubular but which has a substantially thinner wall than the wall thicknesses of core 2 and valve-seat support 10. However, it is equally possible to form core 2 and valve-seat support 10 separately, and to provide a non-magnetic intermediate part in the region of restrictor 13. The valve is actuated electromagnetically in conventional manner.

Running in valve-seat support 10 is a longitudinal bore hole 18 formed concentrically to a longitudinal valve axis 15. Disposed in longitudinal bore hole 18 is for example, a tubular valve needle 19 which is joined, e.g. by, welding, at its downstream end 20 to a spherical valve-closure member 21, at the periphery, of which for example, five flattenings 22 are provided for fuel to flow past.

The electromagnetic circuit, having solenoid coil 1, core 2 and an armature 27, is used for the axial movement of valve needle 19, and thus for opening against the spring tension of a return spring 25 and for closing the injector. Armature 27 is joined to the end of valve needle 19 facing away from valve-closure member 21 by a welded seam and is aligned with core 2. In the downstream end of valve-seat support 10 facing away from core 2, a cylindrical valve-seat member 29 having a fixed valve seat is imperviously mounted by welding in longitudinal bore hole 18.

A guide opening 32 of valve-seat member 29 is used to guide valve-closure member 21 during the axial movement of valve needle 19 with armature 27 along longitudinal valve axis 15. The guidance of armature 27 is achieved for example, by guide noses in the region of restrictor 13. Spherical valve-closure member 21 cooperates with the valve seat of valve-seat member 29, the valve seat tapering frustoconically in the direction of flow. At its end face facing away from valve-closure member 21, valve-seat member 29 is permanently joined to an apertured spray disk 34 having, for example, a cup-shaped design. Apertured spray disk 34 has at least one, e.g., four, spray orifice 35 formed by eroding or punching.

The insertion depth of valve-seat member 29 with apertured spray disk 34 determines the size of the stroke of valve needle 19. In this regard, the one end position of valve needle 19, when solenoid coil 1 is not energized, is established by the contact of valve-closure member 21 against the valve seat of valve-seat member 29, while the other end position of valve needle 19, when solenoid coil 1 is energized, is yielded by the contact of armature 17 against core end 9.

Figure 3:
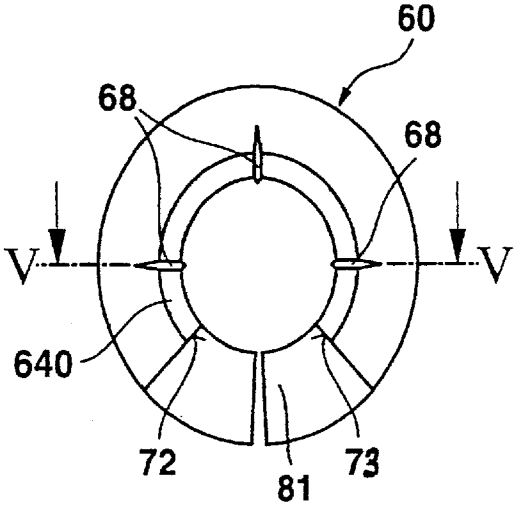
FIG. 3 is a top view of a magnet housing according to the present invention.
Figure 4:
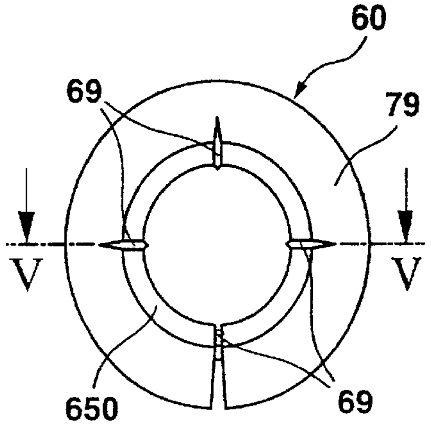
FIG. 4 is a bottom view of the magnet housing illustrated in FIG. 3.
Figure 5:
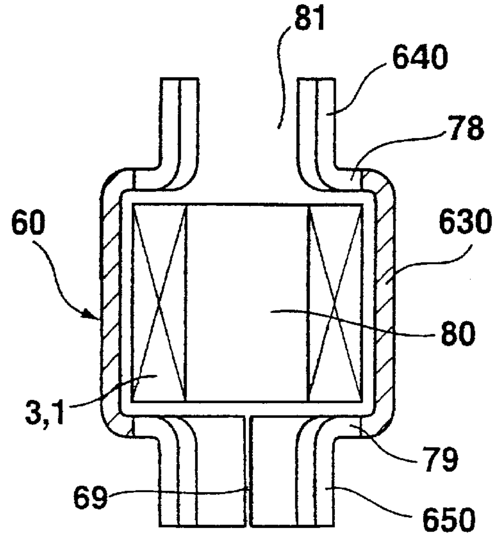
FIG. 5 is a sectional view of the magnet housing taken along the line V—V as shown in FIGS. 3 and 4.

Two conductive elements 45, formed as brackets and serving as ferromagnetic elements, surround solenoid coil 1 at least partially in the circumferential direction, and abut with one end against core 2 and with the other end against valve-seat support 10 to which they can be joined by, for example, welding, soldering or cementing. In the valve of the present invention, conductive elements 45 are replaced by a magnet housing 60 produced according to the invention (FIGS. 3 through 5). However, the fitting position of magnet housing 60 in the axial and radial direction is comparable to that of conductive elements 45, so that magnet housing 60 of the present invention also partially surrounds solenoid coil 1 in the circumferential direction.

The valve is largely enclosed by a plastic extrusion coat 50, which, starting from core 2, extends in the axial direction over solenoid coil 1 and, instead of conductive elements 45, over magnet housing 60 in the case of the invention, up to valve-seat support 10, magnet housing 60 then, for example, being completely covered axially and in the circumferential direction. For example, an electric plug connector 52, injection-molded at the same time, belongs to plastic extrusion coat 50.

Figure 2:
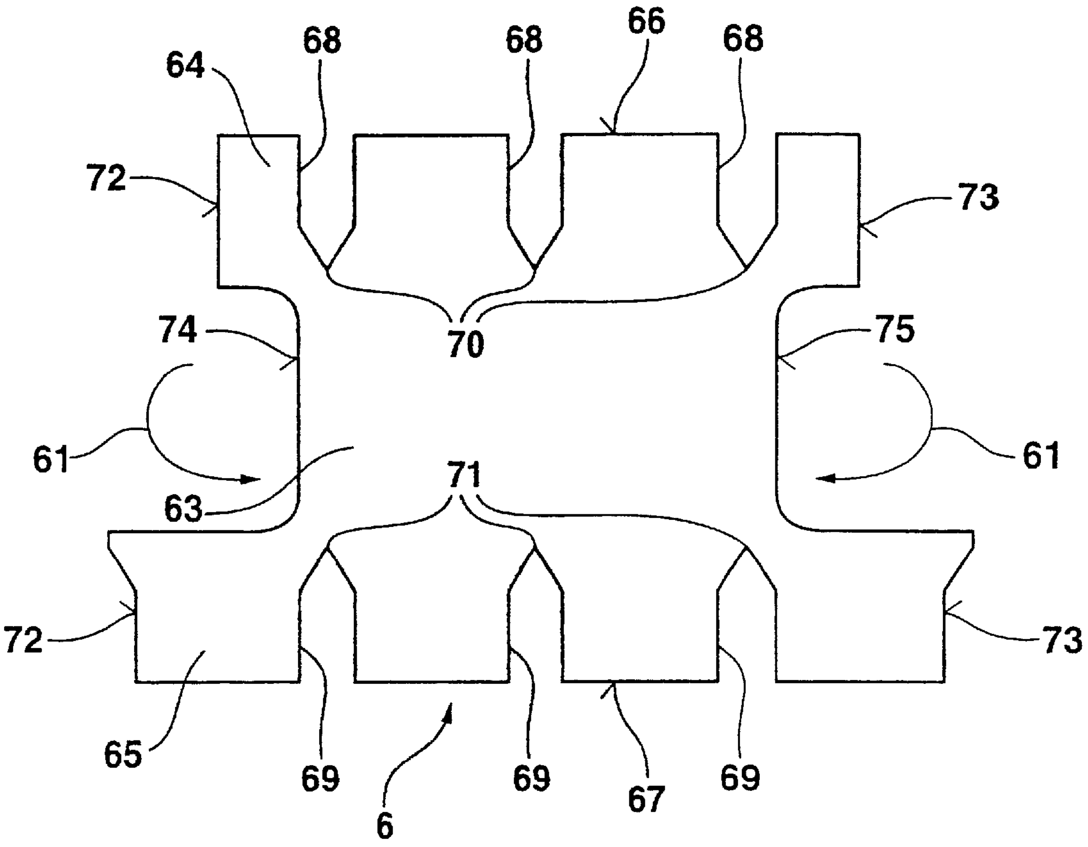
FIG. 2 is a top view of a first embodiment sheet-metal blank used to produce a magnet housing according to the present invention.

FIG. 2 shows a sheet-metal blank 6, which forms the starting point for producing magnet housing 60. For example, this sheet-metal blank 6 is punched out, corresponding to the required dimensions, from a larger sheet of uniform thickness. Sheet-metal blank 6 is subsequently rolled or bent with the aid of a mandrel into the desired shape, so that it assumes a form as shown in FIG. 5. Arrows 61 indicates the rolling motion.

Each individual sheet-metal blank 6 for producing a magnet housing 60 is distinguished by a specific contour, a subdivision into three areas being preferable. A middle area 63, which ultimately forms a housing area 630 of magnet housing 60 surrounding solenoid coil 1 in the circumferential direction, is adjoined in the axial direction, according to the installation in the valve on a first extension line, by an upper and a lower edge area 64 and 65. The two edge areas 64 and 65 ultimately form attachment areas 640 and 650 of magnet housing 60, which permit attachment to core 2 and valve-seat support 10.

Edge areas 64 and 65 have the feature that they are segmented, which means that, starting from an upper and lower boundary edge 66 and 67, in each case a plurality of recesses 68 and 69 are introduced in the direction toward middle area 63, which form segments of respective edge areas 64, 65 between themselves. For example, starting from boundary edges 66, 67, recesses 68, 69 at first extend with parallel lateral edges, which later extend in a converging manner, directed toward a pointed recess end 70, 71. Three recesses 68, 69, for example, are introduced in both edge areas 64, 65 at equal distance relative to each other, so that recesses 68 of upper edge area 64 are formed exactly opposite recesses 69 of lower edge area 65.

However, the two edge areas 64, 65 differ at the two lateral boundary edges 72 and 73. While in lower edge area 65, in each case a complete segment again adjoins the two outer recesses 69, and lateral boundary edges 72 and 73 therefore have the contour of a half recess 69, lateral boundary edges 72, 73 of upper edge area 64 are provided at a distance of less than a segment width from the two outer recesses 68, and in addition, are at right angles to upper boundary edge 66. Compared to lateral boundary edges 72, 73 of edge areas 64, 65, lateral boundary edges 74 and 75 of middle area 63 are indented, which means that after sheet-metal blank 6 is rolled, housing area 630 of magnet housing 60 has a window 80 (FIG. 5) which is bounded by boundary edges 74, 75. According to the definition of the first extension line, the two edge areas 64, 65 in second extension lines running at right angles to the first extension line, project beyond middle area 63. Recess ends 70, 71 of recesses 68, 69 are disposed approximately at the height of the transition shoulders of lateral boundary edges 72, 73 to boundary edges 74, 75 of middle area 63, since later magnet housing 60 is likewise to have shoulders 78, 79 in these areas (FIG. 5).

After preparing sheet-metal blank 6 with the appropriately desired contour, the method for producing magnet housing 60 is divided into two essential steps. In a first method step, the entire sheet-metal blank 6 is rolled or bent, for example, with the aid of a mandrel, until both lateral boundary edges 72, 73 of lower edge area 65 are directly opposite each other. In a second method step, upper and lower edge area 64, 65 are brought to a smaller outside diameter by deformation using, for example, a clasp-type tool, recesses 68, 69 being reduced to a minimal width so that the intervening segments shift close to one another.

The resulting attachment areas 640, 650 act like a collet and can easily be opened during mounting. Since attachment areas 640, 650 are under prestress, the position of magnet housing 60 during assembly of the valve is already well fixed in position on core 2 and valve-seat support 10. As already mentioned, two shoulders 78, 79 (FIG. 5) are formed as transition areas of housing area 630 to the two attachment areas 640 and 650 which have a smaller outside diameter than housing area 630. In this context, recess ends 70, 71 lie in the region of shoulders 78, 79.

FIG. 3 shows a top view of magnet housing 60 produced according to the invention from sheet-metal blank 6 according to FIG. 2, while FIG. 4 shows a bottom view of this magnet housing 60. FIG. 5 in turn is a sectional view of magnet housing 60 along the line V—V in FIGS. 4 and 5. It can be seen from FIG. 3 that lateral boundary edges 72, 73 of upper edge area 64 are disposed opposite each other with clearance, so that coil pins of solenoid coil 1 can be easily guided axially out of magnet housing 60 through this existing interspace 81.

The sectional view according to FIG. 5 indicates that housing area 630 does not extend completely around, but rather is interrupted by window 80. The size of window 80 depends on the depth of boundary edges 74, 75 of middle area 63 on sheet-metal blank 6. For example, window 80 can take up a size of 10 approximately 120° , so that a third of the circumference of housing area 630 is open. Solenoid coil 1 is inserted radially through this window 80, which is indicated schematically in FIG. 5. To simplify insertion of solenoid coil 1 through window 80, housing area 630 can also be slightly bent upward in a simple manner. Window 80 can also be larger or smaller than the 120° , viewed in the circumferential direction.

Figure 6:
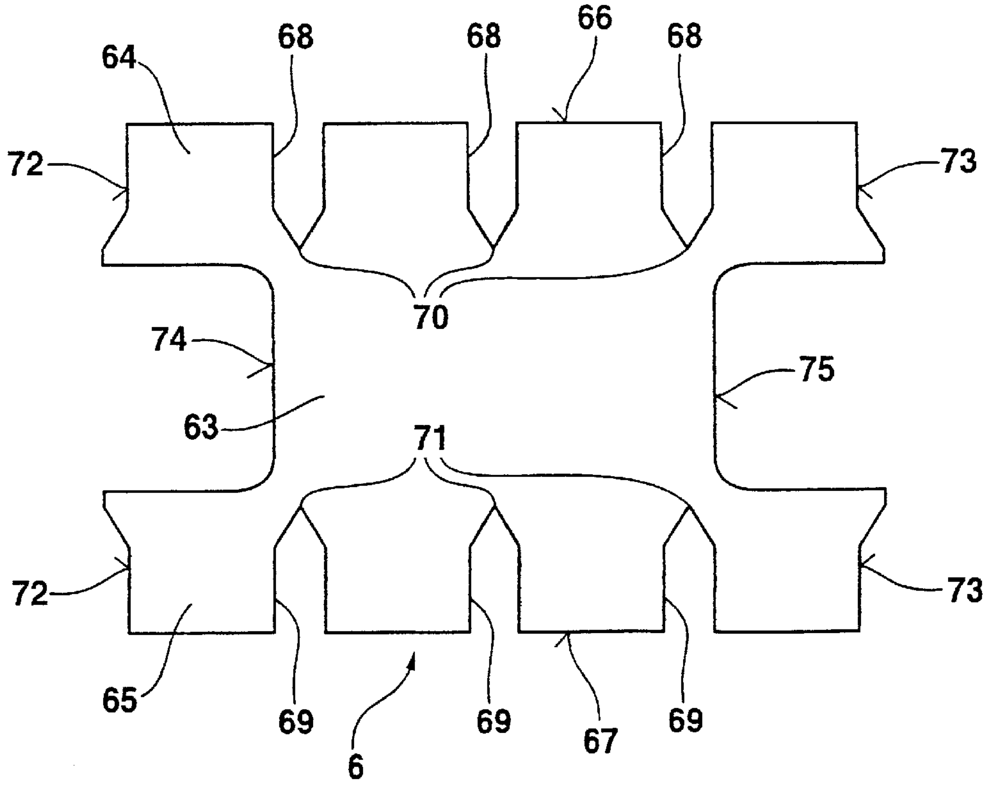
FIG. 6 is a top view of a second embodiment sheet-metal blank used to produce a metal housing according to the present invention.

FIG. 6 shows a second exemplary embodiment of a sheet-metal blank 6 for a magnet housing 60 which differs from sheet-metal blank 6 according to FIG. 2 in that both edge areas 64, 65 are designed identically, indeed in mirror image about middle area 63. Thus, in this example, upper edge area 64 is also constructed such that in each case a complete segment still adjoins the two outer recesses 68 up to lateral boundary edges 72, 73. Therefore, since an interspace 81 no longer exists in the rolled state of magnet housing 60, in this case the coil pins of solenoid coil 1 are brought radially sideways out of window 80.

The invention is on no account restricted to fuel injectors, but rather relates generally to all electromagnetically operable valves in different fields of application.

What is claimed is:

1. An electromagnetically operable valve having a longitudinal valve axis, comprising:

a valve seat;

an electromagnetic circuit having at least one solenoid coil, a core defining an internal pole and an armature; and a magnet housing at least partially surrounding the solenoid coil, the armature causing the valve to open and close at the valve seat, the magnet housing being formed from one of a rolled sheet-metal blank and a bent sheet-metal blank;

wherein the magnet housing includes a middle housing area adjoined in an axial direction on both sides by attachment areas having a smaller outside diameter than the middle housing area.

2. The valve according to claim 1, wherein the valve is an injector for a fuel-injection system of an internal combustion engine.

3. The valve according to claim 1, wherein the middle housing area is interrupted in a circumferential direction.

4. The valve according to claim 3, wherein the middle housing area extend around by approximately 240° , the housing having a window extending by approximately 120° .

5. The valve according to claim 1, further comprising a coil shell, the solenoid coil being accommodated within the coil shell, the coil shell having a larger outside diameter than the attachment areas.

6. The valve according to claim 1, wherein the attachment areas are segmented.

7. The valve according to claim 6, wherein each of the attachment areas includes four segments disposed between recesses.

8. The valve according to claim 7, wherein the recesses extend axially over an entire length of the attachment areas and radially over an entire material thickness of the attachment areas.

* * * * *